(12) United States Patent
Lim et al.

(10) Patent No.: US 7,301,585 B2
(45) Date of Patent: Nov. 27, 2007

(54) DISPLAY APPARATUS

(75) Inventors: Seon-woo Lim, Suwon (KR); Dae-Jin Kim, Kuhee (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 795 days.

(21) Appl. No.: 10/124,377

(22) Filed: Apr. 18, 2002

(65) Prior Publication Data

US 2002/0154093 A1    Oct. 24, 2002

(30) Foreign Application Priority Data

Apr. 18, 2001   (KR) ............................... 2001-20871

(51) Int. Cl.
   *H04N 5/64*    (2006.01)
(52) U.S. Cl. ..................................................... 348/836
(58) Field of Classification Search ................ 348/836, 348/843; 349/58–60
   See application file for complete search history.

(56) References Cited

U.S. PATENT DOCUMENTS

| | | | | |
|---|---|---|---|---|
| 4,716,493 A | * | 12/1987 | Zelkowitz | ................... 361/682 |
| 5,363,150 A | * | 11/1994 | Kojima | ........................ 348/836 |
| 5,450,221 A | * | 9/1995 | Owen et al. | ................... 349/58 |
| 5,654,778 A | * | 8/1997 | Higuchi et al. | ............. 348/836 |
| 6,005,641 A | * | 12/1999 | Ui | ............................... 348/836 |
| 6,039,912 A | * | 3/2000 | Ohira et al. | ............. 264/328.1 |
| 6,525,925 B1 | * | 2/2003 | Lim | ........................... 361/682 |
| 6,894,739 B2 | * | 5/2005 | Sung et al. | ................... 349/58 |

* cited by examiner

*Primary Examiner*—Paulos M. Natnael
(74) *Attorney, Agent, or Firm*—Staas & Halsey LLP (57) ABSTRACT

A display apparatus includes a front casing and a rear casing, a CRT coupled to the front casing and mounted with a degaussing coil, and a main board disposed adjacent to the CRT to transmit electrical signals to the CRT. A base frame receives therein the main board. A frame supporting part, which is positioned in a rear part of the front casing, supports the base frame so as to have an upward angle of inclination in a backward direction. With this configuration, a display apparatus has a visual volume that is reduced to a minimum and the assembly is prevented from tipping forward in the assembling processes.

22 Claims, 9 Drawing Sheets

DISPLAY APPARATUS

CROSS-REFERENCE TO RELATED APPLICATION

This application claims the benefit of Korean Application No. 2001-20871, filed Apr. 18, 2001, in the Korean Intellectual Property Office, the disclosure of which is incorporated herein by reference.

BACKGROUND OF THE INVENTION

1. Field of the Invention

The present invention relates in general to display apparatuses, and more particularly, to a display apparatus with a base frame having an improved installation structure.

2. Description of the Related Art

A display apparatus collectively refers to monitors for TV sets, monitors for computers and so on. The display apparatus typically includes a cathode ray tube (CRT) monitor and a liquid crystal display (LCD) monitor.

The CRT monitor uses a principle by which light with different brightnesses or colors is emitted by allowing an electron beam with different amounts depending upon the intensity of picture signals to strike a single-colored or RGB (Red, Green, Blue) colored fluorescent material covered over a panel of the CRT, by use of the cathode ray tube. The CRT monitor is advantageously cheap, but it is voluminous. As such, the CRT monitor thereby needs a larger space for installation, thereby reducing the spatial utility. To improve such a disadvantage, technologies focused on minimizing a physical volume of the display apparatus employing the CRT have recently been developed continuously.

Figure 6:
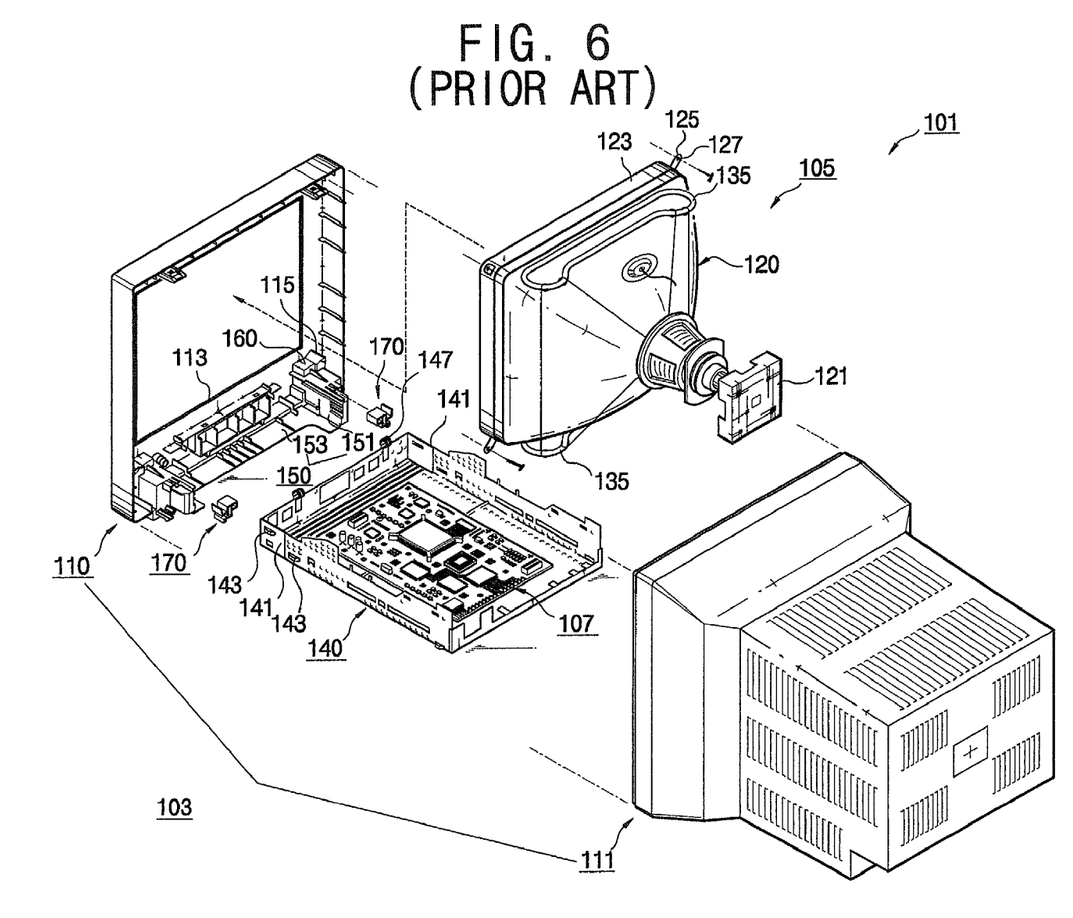
FIG. 6 is an exploded perspective view of a conventional display apparatus.
Figure 7:
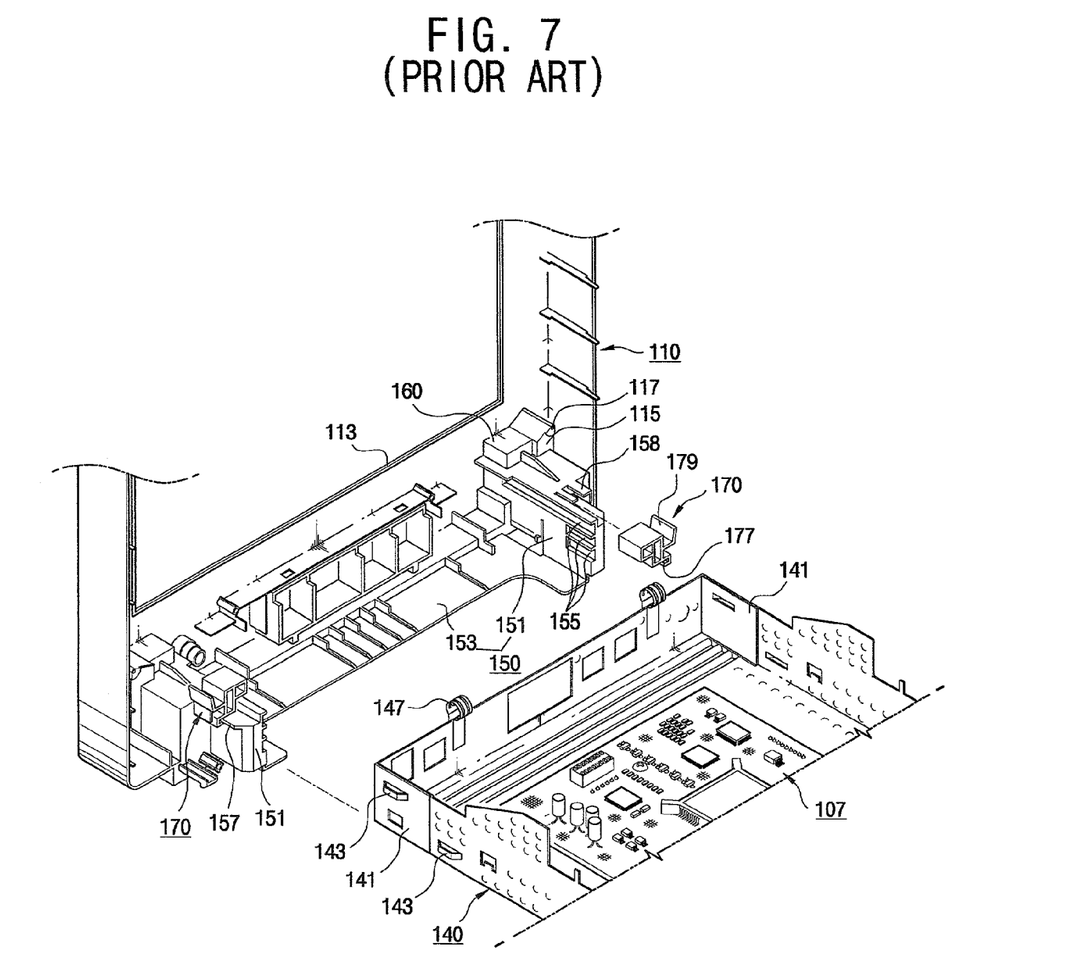
FIG. 7 is a partially enlarged perspective view of the installation region of the base frame of FIG. 6.

FIG. 6 is an exploded perspective view of a conventional display apparatus and FIG. 7 is an enlarged view showing a part of an installation region of a base frame 140 of FIG. 6. As illustrated, the conventional display apparatus 101 includes a casing 103 that defines an external appearance of the display apparatus 101. A main board 107 is mounted with a cathode ray tube assembly 105 housed within the casing 103 and transmits electrical signals into the CRT assembly 105. The base frame 140 supports the main board 107.

The casing 103 includes a front casing 110 and a rear casing 111, which are coupled with each other to form a space therein to receive components such as the CRT assembly 105 and the main board 107 and so on. The front casing 110 is formed with an opening 113 in a rectangular shape, through which pictures to be displayed on a front surface of a panel of a CRT 120 can be transmitted to the outside. On each inside corner of a back face of the front casing 110 is provided a CRT coupling part 115 having a female screw part 117. The female screw parts 117 are used to couple the front casing 110 with the CRT assembly 105.

A pair of CRT supporting parts 160 and a frame supporting part 150 are on opposite lower sides of the back face of the front casing 110. Each of the CRT supporting parts 160 is positioned adjacent to one of the CRT coupling parts 115 and supports the front lower end parts of the CRT assembly 105. The CRT supporting parts 160 are also adjacent the frame supporting part 150 that couple the front casing 110 with the base frame 140.

The frame supporting part 150 includes a pair of side wall supporting parts 151 extended rearward from a lower part of the CRT supporting part 160 to support front regions of opposite side walls 141 of the base frame 140. The frame supporting part 150 also includes a lower supporting part 153 interconnecting both side wall supporting parts 151, to support a lower face of the front region of the base frame 140.

Guide grooves 155 are formed on back regions of the inner side walls of the front casing 120 opposite to both side wall supporting parts 151. The guiding grooves 155 are parallel with each other such that a plurality of engaging projections 143 formed on the side walls 141 of the base frame 140 are slidingly inserted into the corresponding guide grooves 155.

The CRT assembly 105 includes the CRT 120, and a combination 121 of an electron gun and a video device 121 installed on a back end region of the CRT 120. On the top and the bottom of the CRT 120 are respectively provided degaussing coils 135 to remove electromagnetic forces generated from the CRT 120 and its neighboring components and to stabilize the pictures to be displayed on the panel. The CRT assembly 105 is coupled to the front casing 110 by a coupling band 123. The coupling band 123 is made of metallic material and is provided along a front circumference of the CRT 120. For this purpose, a coupling piece 125 is outwardly projected from each corner of the coupling band 123. The coupling piece 125 has a screw passing hole 127 by which the CRT assembly 105 is screw-coupled to the CRT coupling part 115 front casing 110 using screws.

The base frame 140 has a rectangular tray shape, and has an outer circumferential wall within which the main board 107 is housed. On opposite side walls 141 of a front region of the base frame 140 are formed the plurality of engaging projections 143 to be inserted into the plurality of guiding grooves 155 formed on the side wall supporting parts 151 of the frame supporting part 150. The engaging projections 143 are on each of the side walls 141 of the base frame 140 and are slidingly inserted into the guiding grooves 155 of the side wall supporting parts 151, thereby allowing the base frame 140 to be coupled horizontally and perpendicularly to the front casing 110.

To the top of each side wall supporting part 151 is coupled a supporting holder 170. The supporting holder 170 fixedly positions a side part of the degaussing coil 135 disposed at the lower part of the CRT 120 and supports a portion of the panel of the CRT 120. The supporting holder 170 is detachably coupled to the side wall supporting part 151. For this coupling, a "U"-shaped engaging part 177 couples to the side wall supporting part 151. The engaging part 177 is formed on a lower outer side of the supporting holder 170. A guiding projection 157 is inserted into the engaging part 177 and a guide 158 having an inverted "L" shape supports an outside of the engaging part 177. The guide 158 is formed on the upper outside part of the side wall supporting part 151.

An "L"-shaped coil receiving part 179 supports a side part of the degaussing coil 135 and is formed on the upper outside of each of the supporting holders 170. The coil receiving part 179 extends outward from the supporting holder 170 and forms an "L"-shaped receiving groove jointly with an outside wall of the supporting holder 170. A coil band 147 is coupled to the top end of the front wall of the base frame 140. The coil band 147 holds a section of the degaussing coil 135 disposed lengthwise at the lower part of the CRT 120.

Figure 8:
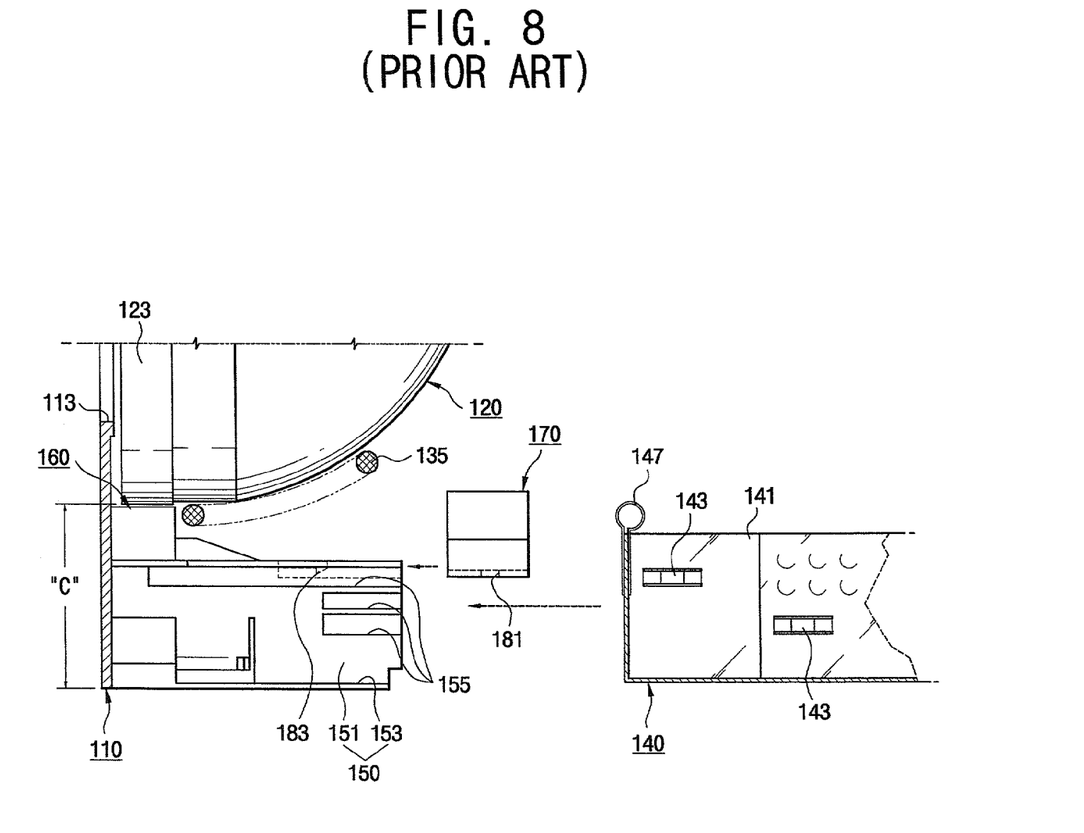
FIGS. 8 and 9 are partially enlarged perspective views showing an installation sequence for the installation of the base frame as seen in FIGS. 6 and 7.

As shown in FIG. 8, a holder supporting part is on the side wall supporting part 151 and the supporting holder 170. The holder supporting part prevents the supporting holder 170 from being moved. The holder supporting part includes an engaging hole 181 formed in a lower part of the supporting holder 170 and a hook 183 formed on the top of the side wall supporting part 151 and engaged with the engaging hole 181, which is elastically deformable.

Figure 9:
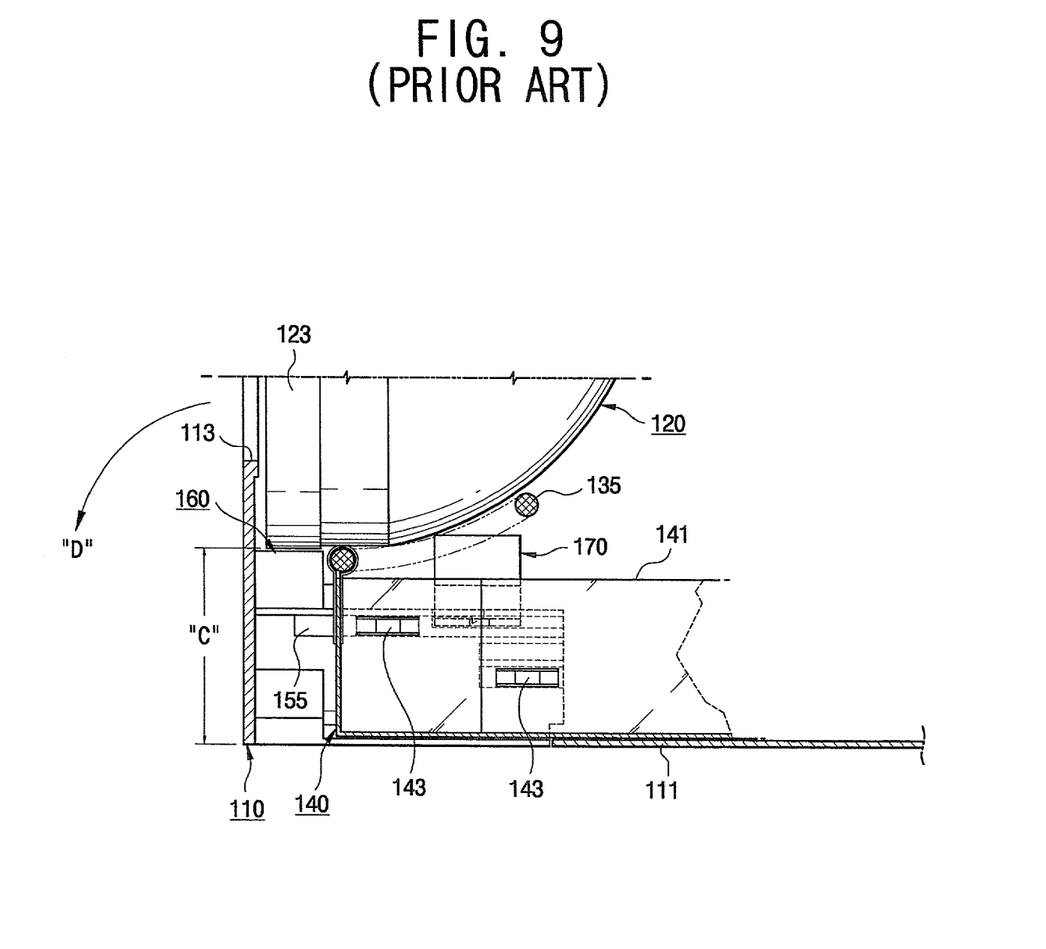

However, in the conventional displaying apparatus, since the base frame 140 is, as illustrated in FIGS. 8 and 9, horizontally coupled to the frame supporting part 150 formed on the back lower part of the front casing 110, there is a limit to the reduction In the size of the displaying apparatus. In other words, since the base frame 140 is horizontally and orthogonally coupled to the front casing 110, a reduction of the height of the rear cover 111 is limited.

In addition, to allow the base frame 140 to be coupled to the front casing 110 in a stable manner and to remain horizontal, it is necessary to form the plurality of guiding grooves 155 and the engaging projections 143. Therefore, the height of the side wall supporting part 151 and the size of the side wall 141 of the base frame 140 need to be relatively large. In order to install the base frame 140 on the lower regions of the front casing 110 and the rear cover 111, it is necessary to secure a sufficient space. Accordingly, the volume of the display apparatus ("C" indicated in FIGS. 8 and 9) is to be enlarged accordingly.

In addition, since the degaussing coil 135 disposed at the lower part of the CRT 120 is fixedly positioned by the coil receiving part 179 when the supporting holder 170 is coupled to the top part of the side wall support part 151, and the coil band 147 is coupled to the top part of the front wall of the base frame 140, the position of the degaussing coil 135 is fixed around the top region of the base frame 140. Thus, the volume of the display apparatus is additionally enlarged in order to secure such a space.

Further, in the conventional displaying apparatus, since the base frame 140 is horizontally and orthogonally coupled to the front casing 110, a combination of the CRT 120 and the base frame 140 with the front casing 110 is likely to fall forward ("D" indicated in FIG. 9) due to the weight of the CRT in the next assembling process.

SUMMARY OF THE INVENTION

The present invention has been made keeping in mind the above and other problems, and an object of the present invention is to provide a display apparatus having a minimal visual volume and that prevents the display apparatus from tipping forward in the next assembling process.

Additional objects and advantages of the invention will be set forth in part in the description which follows and, in part, will be obvious from the description, or may be learned by practice of the invention.

This and other objects of the present invention may be achieved by providing a display apparatus according to an embodiment of the invention that includes a front casing and a rear casing, a cathode ray tube (CRT) coupled to the front casing and mounted with a degaussing coil and supported by the front casing and rear casing along a support plane, and a main board disposed adjacent to the CRT that transmits electrical signals to the CRT, a base frame that holds the main board, and a frame supporting part at a rear part of the front casing and that supports the base frame to have an upward angle of inclination in a backward direction so as to not be parallel to the support plane.

According to an aspect of the invention, the frame supporting part comprises a pair of side wall supporting parts provided at the rear lower part of the front casing supporting part, the side wall supporting parts to support opposite side walls of the base frame, and a lower supporting part provided between the pair of side wall supporting parts, to support the front lower part of the base frame.

According to another aspect of the invention, each inside wall of each side wall supporting part includes a lower guiding groove inclined upwardly in the backward direction, and the side walls include lower projections that are slidingly inserted into the respective lower guiding grooves.

According to yet another aspect of the invention, the display apparatus further comprises a CRT supporting part that protrudes upwardly from an end part of the side wall supporting part, and supports a lower part of the CRT.

According to still another aspect of the invention, the display apparatus further comprises a pair of supporting holders detachably coupled to the upper parts of the respective side wall supporting parts, the supporting holders to stably position the degaussing coil of the CRT in front of the base frame and on the outside of both side walls thereof.

According to a further aspect of the invention, an inside wall of each supporting holder includes an upper guiding groove inclined and parallel with the lower guiding groove of the side wall supporting part, and each side wall of the base frame includes an upper projection that is slidingly inserted into the upper guiding groove.

According to a still further aspect of the invention, coil holding parts, each of which holds a corresponding portion of the degaussing coil in cooperation with a backward wall of the corresponding CRT supporting part, are formed in the front of the corresponding supporting holders.

According to a yet further aspect of the invention, coil guide walls, each of which is on the outside of the corresponding side wall supporting part, extend from the corresponding CRT supporting parts backward along the outside wall of the corresponding side wall supporting parts, and coil receiving parts, each of which is formed on the outside wall of the corresponding supporting holder, receive therein corresponding portions of the degaussing coil in cooperation with the coil guide walls.

According to an additional aspect of the invention, an auxiliary CRT supporting part is formed on a back end portion of the supporting holder, the auxiliary CRT supporting part to support a portion of a funnel of the CRT.

According to a yet additional aspect of the invention, a lower part of each supporting holder includes a rail groove formed lengthwise, and an upper part of each side wall supporting part includes a guide rail to couple with the corresponding rail groove.

According to a still additional aspect of the invention, the display apparatus further comprises holder supporting parts to prevent movement of the supporting holders.

According to a yet still additional aspect of the invention, the holder supporting parts includes engaging holes formed at the front of corresponding supporting holders, and hooks protruding from the backward wall of the corresponding CRT supporting parts to be elastically engaged into and disengaged from the engaging holes.

According to yet still another aspect of the invention, the display apparatus further comprises hook protecting projections that protrude from the backward wall of corresponding CRT supporting parts and which limit an upward range of elastic deformation of the hooks.

According to another aspect of the invention, the display apparatus further includes supporting holders coupled to said frame supporting part along the support plane and coupled to said base frame along the second plane.

According to an aspect of the invention, each supporting holder is attached to the frame supporting part using a rail and a groove along the support plane, the rail is on one of the frame supporting part and the supporting holder, and the groove is on the other of the frame support part and the supporting holder.

According to an aspect of the invention, the frame supporting part includes side wall supporting parts, each side wall supporting part including the one of the rail and the groove.

According to an aspect of the invention, each supporting holder is attached to the base frame using a projection and a groove along the second plane, the projection is on one of the base frame and the supporting holder, and the groove is on the other of the base frame and the supporting holder.

According to an aspect of the invention, the base frame further includes side walls, and the one of the projection and the groove is on one of the side walls so as to be received by the corresponding supporting holder.

According to an aspect of the invention, each holder supporting part includes an engaging hole formed at one of a front of the corresponding supporting holder and a back wall of the corresponding CRT supporting part, a hook protruding from the other of the front of the corresponding supporting holder and the back wall of the corresponding CRT supporting part, and the hook is elastically engaged into and disengaged from the corresponding engaging hole.

According to another embodiment of the invention, a display apparatus includes a casing having an opening and an interior space, a cathode ray tube (CRT) coupled to the casing, the CRT being supported in the interior space of the casing along a first plane such that the CRT displays information through the opening, a main board disposed adjacent the CRT to transmit electrical signals to the CRT, a base frame disposed to hold said main board, and a supporting part attached to the casing, the supporting part to support the base frame along a second plane that is not parallel with the first plane.

According to an aspect of the invention, the supporting part includes one of a groove and a rail to be received into the other of the groove and the rail of the casing such that the supporting part is attached to the casing along the first plane.

According to an aspect of the invention, the supporting part includes one of a groove and a rail to be received into the other of the groove and the rail of the base frame such that the supporting part is attached to the base frame along the second plane.

According to an aspect of the invention, the supporting part includes one of a groove and a rail to be received into the other of the groove and the rail of the casing such that the supporting part is attached to the casing along the first plane, the supporting part includes one of another groove and another rail to be received into the other of the another groove and the another rail of the base frame such that the supporting part is attached to the base frame along the second plane.

According to an aspect of the invention, the supporting part includes a supporting portion that is not detachable from the casing, the supporting portion including one of a groove and a rail to be received into the other of the groove and the rail of the base frame such that the supporting part is attached to the base frame along the second plane.

According to an aspect of the invention, the supporting part includes another supporting portion that is detachably attached to the casing, the another supporting portion including one of another groove and another rail to be received into the other of the another groove and the another rail of the base frame such that the supporting part is attached to the base frame along the second plane.

According to an aspect of the invention, the CRT further includes a degaussing coil, and the supporting part forms a channel with said casing into which portions of the degaussing coil are received.

According to an aspect of the invention, the portions of the degaussing coil received in the channel include one portion that is not between the CRT and the base frame.

According to a further embodiment of the invention, a housing for a display apparatus having a main board, includes a casing having an opening and an interior space into which the display apparatus is to be supported along a first plane such that the display apparatus displays information through the opening, a base frame disposed to hold the main board adjacent the display apparatus, and a supporting part attached to the casing, the supporting part to support the base frame along a second plane that is not parallel with the first plane.

According to an aspect of the invention, the supporting part includes one of a groove and a rail to be received into the other of the groove and the rail of the casing such that the supporting part is attached to said casing along the first plane.

According to an aspect of the invention, the supporting part includes one of a groove and a rail to be received into the other of the groove and the rail of the base frame such that the supporting part is attached to the base frame along the second plane.

According to an aspect of the invention, the supporting part includes one of a groove and a rail to be received into the other of the groove and the rail of the casing such that the supporting part is attached to said casing along the first plane, and the supporting part includes one of another groove and another rail to be received into the other of the another groove and the another rail of the base frame such that the supporting part is attached to the base frame along the second plane.

According to an aspect of the invention, the supporting part forms a channel with said casing into which portions of a degaussing coil of the display apparatus are received.

According to an aspect of the invention, the portions of the degaussing coil received in the channel include one portion that is not between the CRT and the base frame.

According to an additional embodiment of the invention, a method of assembling a display apparatus includes attaching a cathode ray tube (CRT) assembly to a casing having an opening such that the CRT assembly is able to display information through the opening, sliding a supporting part along a first plane using one of a rail and a groove of the casing so as to support a portion of the CRT assembly, and sliding a base frame along a second plane that is not parallel with the first plane using one of another groove and another rail of the supporting part or the casing, the base frame holding a main board that sends signals to the CRT assembly.

According to an aspect of the invention, the method further includes attaching another casing to the casing so as to enclose the CRT assembly.

According to an aspect of the invention, the CRT assembly further includes a degaussing coil, the sliding the supporting part forms a channel between the supporting part and the casing, and the attaching the CRT assembly further includes positioning portions of the degaussing coil in the formed channel.

According to an aspect of the invention, the formed channel extends between the supporting part, the front of the casing, and another side of the casing adjacent to the front of the casing.

According to an aspect of the invention, the method further includes attaching the supporting part to the casing using an elastic part that is received in a receiving recess after said sliding the supporting part, the elastic part being on one of the casing and the supporting part and the receiving recess being in the other of the casing and the supporting part.

According to an aspect of the invention, the method further includes resting the combined CRT, casing, and base frame backward on the base frame, the second plane is sufficiently non-parallel with the first plane such that a weight of the CRT prevents the combined the combined CRT, casing, and base frame from pitching in a forward direction relative to the casing.

BRIEF DESCRIPTION OF THE DRAWINGS

The present invention will be better understood and its various objects and advantages will be more fully appreciated from the following description of the embodiments when taken in conjunction with the accompanying drawings, in which.

DETAILED DESCRIPTION OF THE EMBODIMENTS

Hereinbelow, the embodiments of the present invention will be described in more detail with reference to the accompanying drawings, wherein like reference numerals refer to the like elements throughout. The embodiments are described below in order to explain the present invention by referring to the figures.

Figure 1:
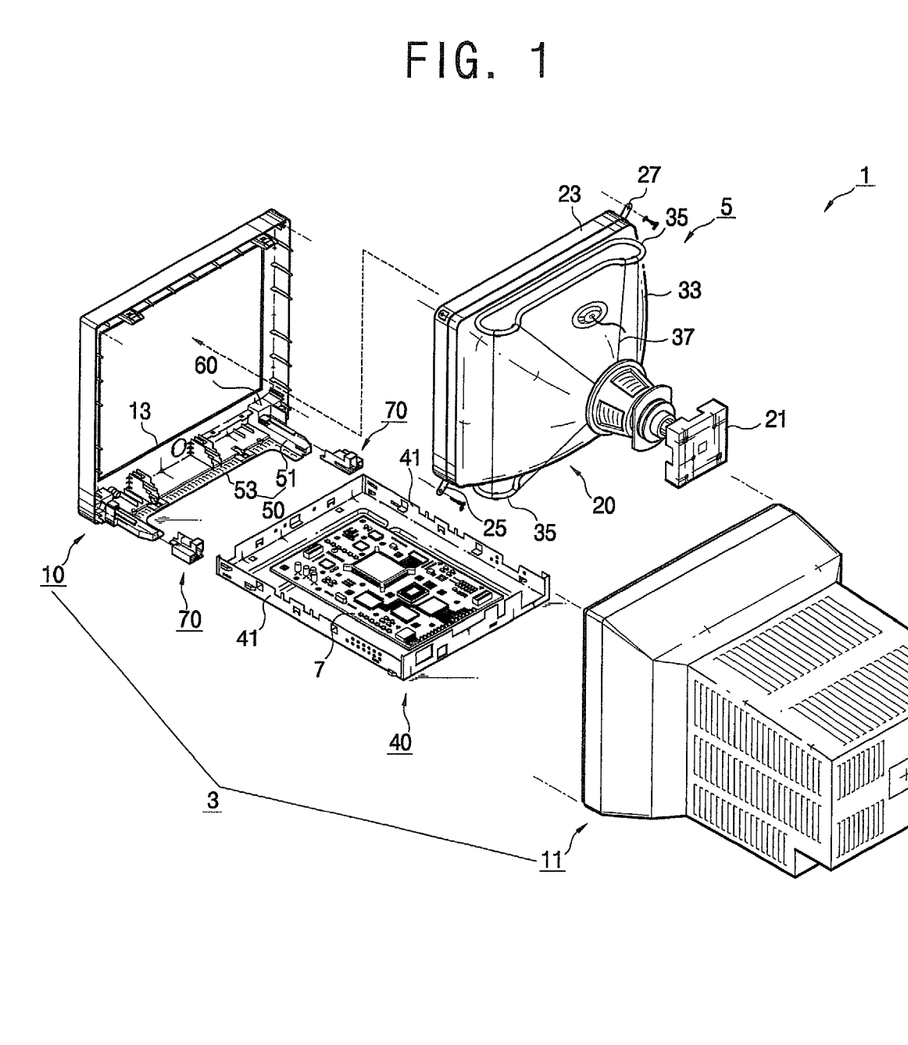
FIG. 1 is an exploded perspective view of a display apparatus according to an embodiment of the present invention.

FIG. 1 is an exploded perspective view of a display apparatus 1 according to an embodiment of the present invention. As illustrated, the display apparatus 1 includes a casing 3 defining an external appearance of the display apparatus 1, a CRT assembly 5 housed in the casing 3, a main board 7 that transmits electrical signals to the CRT assembly 5 and a base frame 40 that supports the main board 7 therein.

The casing 3 includes a front casing 10 and a rear casing 11, which are coupled to each other to define a space therein that receives components such as the CRT assembly 5, the main board 7 and so on. The front casing 10 includes an opening 13 in a rectangular shape, to which a panel (not shown) of the CRT 20 fits and through which pictures to be displayed on a front surface of the panel are transmitted to the outside. On each inner corner of a back face of the front casing 10 is provided a CRT coupling part 15. On the CRT coupling part 15 is formed a female screw part 17 used to couple the front casing 110 with the CRT assembly 105 by a screw. The casing 3 supports the CRT assembly 5 along a support plane so as to allow the front surface of the panel of the CRT assembly 5 to fit within the opening 13. As shown, the support plane is horizontal.

The CRT assembly 5 is provided with the CRT 20. The CRT 20 includes a combination of a panel and a funnel 33, a combination of an electron gun (not shown) and a video device 21 attached at a rear part of the CRT 20, a coupling band 23 of metallic material attached to the combined area of the panel and the funnel 33 of the CRT 20 along the circumference thereof. A coupling piece 25 is exposed outward on each corner of the coupling band 23 so as to allow the CRT assembly 5 to be coupled to the front casing 10. On each coupling piece 25 is a screw passing hole 27 corresponding to one of the female screw part 17 formed on the CRT coupling part 15. On the top and the bottom of the CRT 20 are provided degaussing coils 35 that remove electromagnetic forces generated from the CRT 20 and neighboring components to stabilize pictures displayed on the panel.

The degaussing coil 35 has a closed loop shape. A portion contacts the coupling band 23 along the lengthwise direction at the top and the bottom of the CRT 20, and another portion contacts curved faces of the top and the bottom of the funnel 33 of the CRT 20. Each degaussing coil 35 is fixed by a thin wire 37. The wires 37 fix the degaussing coils 35 to the CRT 20 to thereby prevent the degaussing coils 35 from being removed from the CRT 20. The degaussing coils 35 are electrically connected to the main board 7.

The base frame 40 has a rectangular tray shape having circumferential outer walls within which the main board 7 is housed. Of these walls, each of opposite side walls 41 includes at a top and a bottom towards a front of the base frame 40 an upper projection 43 and a lower projection 45. The projections 43 and 45 are slidingly inserted into a corresponding upper guiding groove 73 of a supporting holder 70 (to be described later) and a corresponding lower guiding groove 55 of a frame supporting part 50 (to be described later). Preferably, the base frame 40 is manufactured by press-molding a metallic plate. The upper and lower projections 43, 45 are formed by bending outward a portion of opposing side walls 41 of the base frame 40. However, other manufacturing methods and materials can be used.

A CRT supporting part 60 is disposed adjacent to each of the CRT coupling parts 15 to support a front lower end of the CRT 20. A frame supporting part 50 supports the base frame 40 so as to have an upward angle of inclination in a backward direction leading away from the front casing 10 in a direction non-parallel with the support plane. The frame supporting part 50 is integrally combined on the rear lower portion of the front casing 10.

The supporting holders 70 are detachably coupled to the frame supporting part 50. The supporter holders 70 support corresponding opposing side walls 41 of the base frame 40, position the degaussing coil 35 coupled to the lower part of the CRT 20, and support the funnel 33 of the CRT 20.

Figure 2:
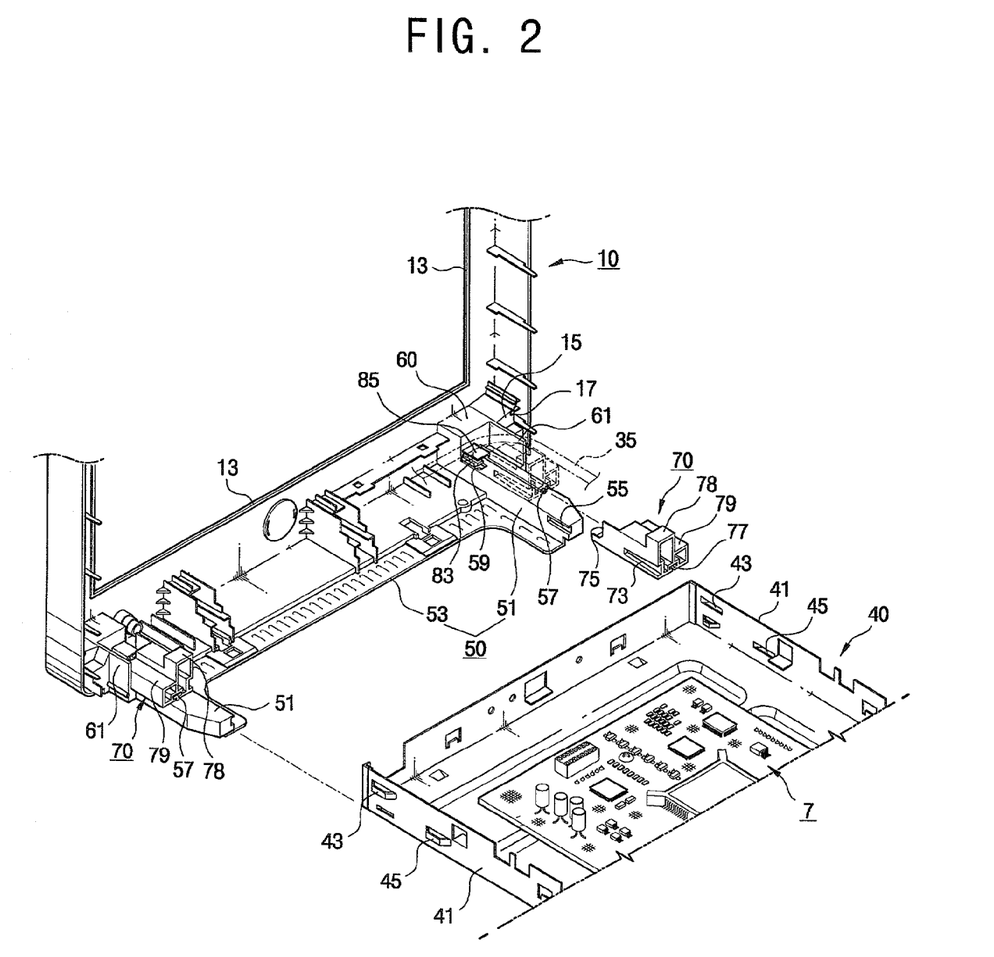
FIG. 2 is an enlarged perspective view showing a part of an installation region of a base frame of FIG. 1.
Figure 3:
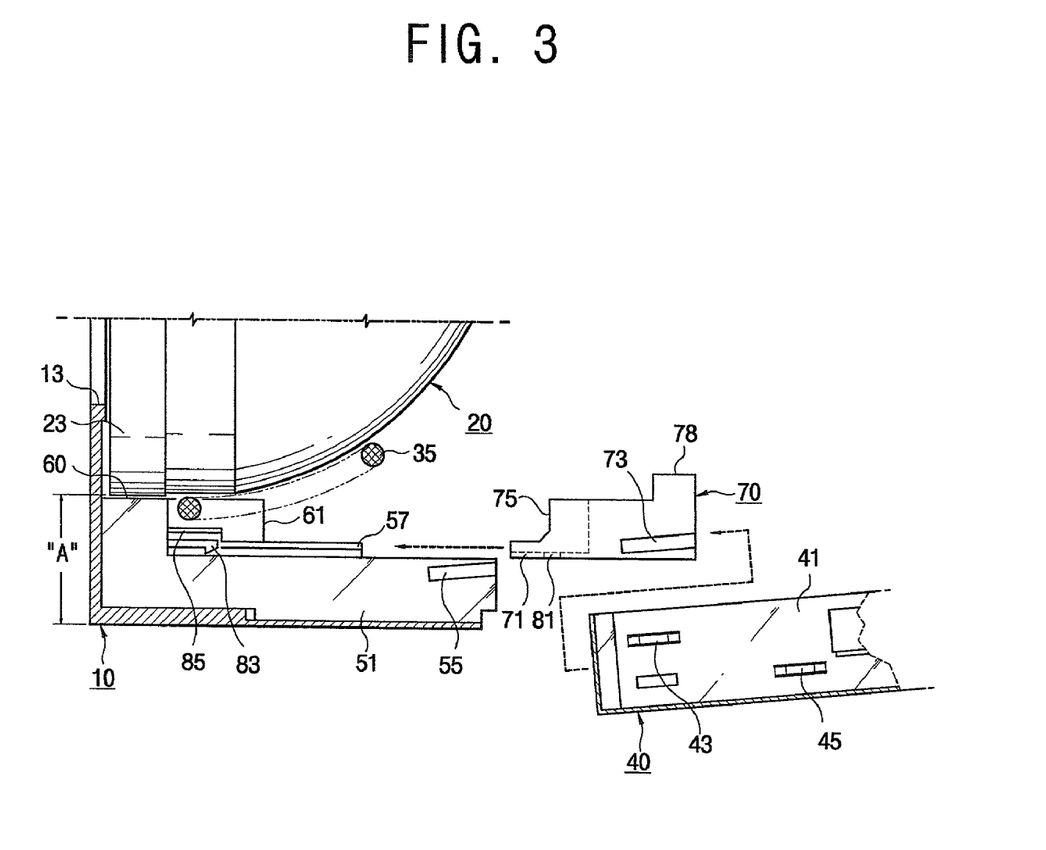
FIGS. 3 through 5 are partially enlarged perspective views showing an installation sequence for the installation of the base frame as seen in FIGS. 1 and 2.

The frame supporting part 50 has a pair of side wall supporting parts 51 that support a front portion of the base frame 40. A lower supporting part 53 connects both side wall supporting parts 51 and supports a front lower part of the base frame 40. On inside walls of each side wall supporting part 51 facing the other side wall supporting part 51 is a lower guiding groove 55 into which the corresponding lower projection 45 of the base frame 40 is slidingly inserted. The lower guiding groove 55 is, as illustrated in FIG. 3, displaced so as to have a predetermined upward angle of inclination in the backward direction. With this configuration, when the lower projections 45 of the base frame 40 are slidingly inserted into the inclined lower guiding grooves 55 of the side wall supporting parts 51, the base frame 40 is so coupled to the frame supporting part 50 as to have an upward angle of inclination in the backward direction. In addition, on the top faces of both side wall supporting parts 51 are lengthwise formed guide rails 57. Each guide rail 57 has a T-shaped cross-section to couple with the corresponding supporting holder 70.

A top face of the CRT supporting part 60 protrudes upward from an end part of the side wall supporting part 51, to support the lower part of the CRT 20. On an outside of the CRT supporting part 60 is a coil guide wall 61 that extends a predetermined length in the backward direction along the outside wall of the side wall supporting part,51. The coil guide wall 61 positions the degaussing coil 35 in cooperation with a coil receiving part 79 (to be described later) formed on an outside part of the supporting holder 70.

Each supporting holder 70 includes a rail groove 77. The rail grooves 77 couple with the corresponding guide rails 57 of the side wall supporting parts 51. The upper guiding grooves 73 support the upper projections 43 of the opposing side walls 41 of the base frame 40. Each supporting holder 70 also includes a coil holding part 75 that fixedly positions a portion of the degaussing coil 35 in front of the base frame 40. A coil receiving part 79 fixedly positions another portion of the degaussing coil 35 outside both opposing side walls 41 of the base frame 40. An auxiliary CRT supporting part 78 supports a portion of the funnel 33 of the CRT 20.

The rail groove 77 receives the corresponding shape to the T-shaped guide rail 57 of the side wall supporting part 51 on the top face of the corresponding supporting holder 70. Under this configuration, if the supporting holder 70 is slidingly moved frontward along the top face of the side wall supporting part 51, the guide rail 57 of the side wall supporting part 51 is mutually combined with the rail groove 77 of the supporting holder 70. Thus, the supporting holder 70 is detachably coupled to the upper part of the side wall supporting part 51.

As shown in FIG. 3, the upper guiding groove 73 of the supporting holder 70 is inclined upward in the backward direction so as to be parallel with the lower guiding groove 55 formed on the side wall supporting part 51. The upper projections 43 of the base frame 40 are slidingly inserted into the upper guiding grooves 73. In other words, the lower projections 45 and the upper projections 43 formed on both side walls 41 of the base frame 40 are inserted into the lower guiding grooves 55 and the upper guiding grooves 73 formed on the inside walls of the side wall supporting part 51 and the supporting holder 70. The base frame 40 is then coupled to the bottom face of the front casing 10 so as to have an upward angle of inclination in the backward direction.

The coil holding part 75 is extended frontward from the inside of the supporting holder 70 so as to form an "L" shape. When combined with the back wall of the CRT supporting part 60 when the supporting holder 70 is coupled to the side wall supporting part 51, the coil holding part 75 forms a "U" shaped coil holding groove. With this configuration, when the supporting holder 70 is coupled to the side wall supporting part 51 when the CRT assembly 5 is coupled to the front casing 10, the coil holding part 75 holds a portion of the degaussing coil 35 disposed in the lower portion of the CRT 20 in cooperation with the back wall of the CRT supporting part 60, to thereby fixedly position the degaussing coil 35 in front of the base frame 40.

The coil receiving part 79 protrudes outwardly in the lower of the supporting holder 70 so as to form an "L"
shaped groove. When the supporting holder 70 is combined with the side wall supporting part 51, the coil receiving part 79 creates a "U"-shaped receiving groove in cooperation with the coil guide wall 61. With this configuration, when the supporting holder 70 is coupled to the side wall supporting part 51 when the CRT assembly 5 is coupled to the front casing 10, the coil receiving part 79 receives a curved portion of the degaussing coil 35 in cooperation with the coil guide wall 61, thereby fixedly positioning the degaussing coil 35 outside of both side walls 41 of the base frame 40.

The auxiliary CRT supporting part 78 protrudes upwardly in the rear end of the supporting holder 70. The auxiliary CRT supporting part 78 supports a portion of the funnel 33 of the CRT when the supporting holder 70 is coupled to the side wall supporting part 51. With this configuration, the CRT assembly 5 is assembled to the front casing 10 when the front lower end of the CRT 20 is supported by the CRT supporting part 60 and a portion of the lower funnel 33 of the CRT 20 is supported by the auxiliary CRT supporting part 78 of the supporting holder 70, thereby securing the connection to the front casing 11 in a more stable manner along the support plane.

A holder supporting part is on the back wall of the CRT supporting part 60 and on the front region of the supporting holder 70. The holder supporting part prevents the supporting holders 70 from being removed from the side wall supporting parts 51. As shown in FIG. 3, the holder supporting part includes an engaging hole 81 formed on a protruding piece 71 of each supporting holder 70. The protruding piece 71 protrudes from the lower part of the supporting holder 70 parallel with the top face of the corresponding side wall supporting part 51. The holder supporting part also includes a hook 83 that protrudes in the backward direction from the back wall of each CRT supporting part 60 to be elastically engaged into and disengaged from the corresponding engaging hole 81. When engaged, the combined hooks 83 and engaging holes 81 prevent the supporting holders 70 from separating from the side wall supporting parts 51.

Figure 4:
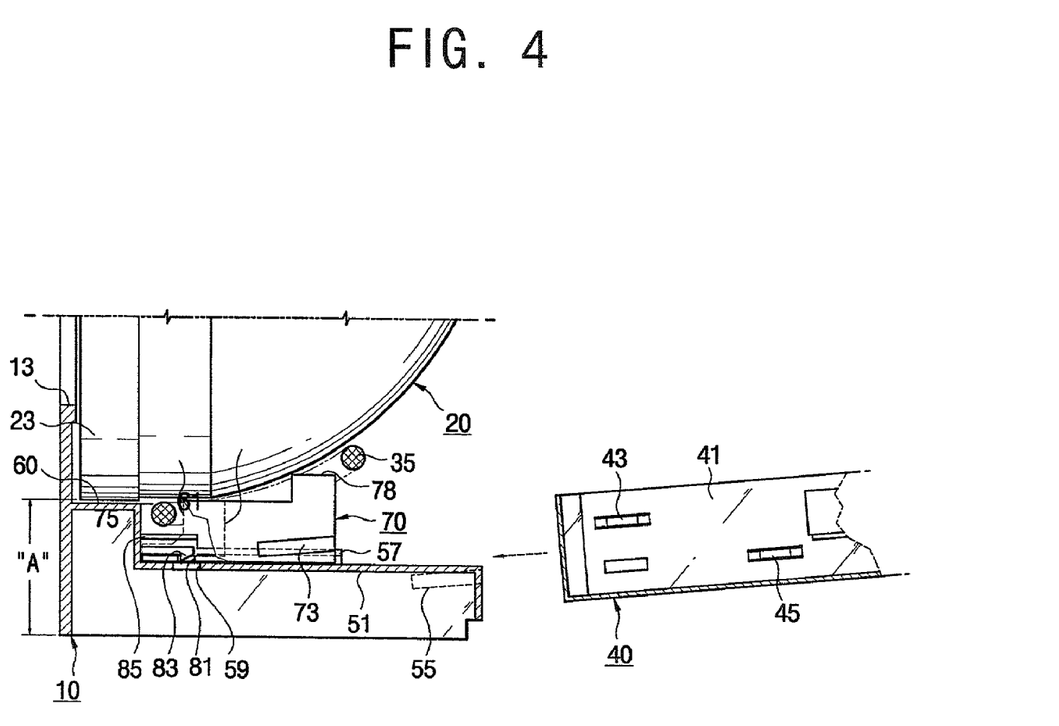

As shown in FIGS. 2 and 4, a disengaging hole 59 is formed on the top face of the side wall supporting part 51 at the position that the engaging hole 81 and the hook 83 are engaged each other. With this configuration, in order to disengage the supporting holder 70, an operator inserts a predetermined jig (not shown) into the disengaging hole 59 from under the side wall supporting part 51. The inserted jig is then pressed upward, which causes the upper end of the jig to push the hook 83 in a disengaging direction. Thus, the supporting holder 70 can be disengaged from the side wall supporting part 51. However, it is understood that the disengaging hole 59 need not be used in all aspects of the invention.

To prevent the hook 83 from being damaged due to excessive elastic deformation in the disengaging direction, a hook protecting projection 85 is above the upper part of the engaging hook 83. The hook protecting projection 85 extends from the backward wall of the CRT supporting part 60 by a predetermined distance and is parallel with the engaging hook 83. Thus, the hook protecting projection 85 controls an amount of the deformation of the hook 83 and thus protects the hook 83 from being damaged. However, the hook protecting projection 85 is not required in all aspects of the invention.

With this configuration, the display apparatus 1 is assembled through the following processes according to an embodiment of the invention. As shown in FIGS. 1 and 4, the front region of the CRT assembly 5 is received inside of the front casing 10. The female screw part 17 of the CRT coupling part 15 is screw-coupled with a screw passing through the screw passing hole 27 of the coupling pieces 25 provided on each corner of the coupling band 23 of the CRT 20, to thereby couple the CRT assembly 5 to the front casing 10. The lower part of the CRT 20 is supported on the top face of the CRT supporting parts 60 of the front casing 10, and is positioned such that a portion of the degaussing coil 35 lengthwise disposed in the lower part of the CRT 20 almost contacts the back wall of the CRT supporting parts 60.

After assembling the CRT assembly 5, the supporting holders 70 are, as shown in FIG. 4, coupled to the upper part of the side wall supporting parts 51. That is, the supporting holders 70 are moved slightly so as to allow the rail grooves 77 formed on the lower of the supporting holders 70 to be engaged with the guide rails 57 formed on the top face of the side wall supporting parts 51, thereby coupling the supporting holders 70 to the side wall supporting parts 51. The coupled supporting holders 70 are then slid along the rail grooves 77 until the coil holding parts 75 formed in the front of the supporting holders 70 create a "U" shaped channel with corresponding back walls of the CRT supporting parts 60. Portions of the degaussing coil 35 of a lower part of the CRT 20 are received in and fixedly positioned by the formed "U" shaped channels.

In addition, after being slid, the coil receiving parts 79 formed on the outside of the supporting holders 70 form other "U" shaped channels with the corresponding coil guide walls 61. The curved sides of the degaussing coil 35 are received in and fixedly positioned by the other formed "U" shaped channels.

After being slid, the engaging holes 81 formed on the protruding pieces 71 of the supporting holders 70 are elastically engaged with the hooks 83 formed on the lower backward walls of the CRT supporting parts 60, to thereby prevent arbitrary movement of the supporting holders 70. At this time, the auxiliary CRT supporting parts 78 on the backward top ends of the supporting holders 70 support portions of the funnel 33 of the CRT 20.

Figure 5:
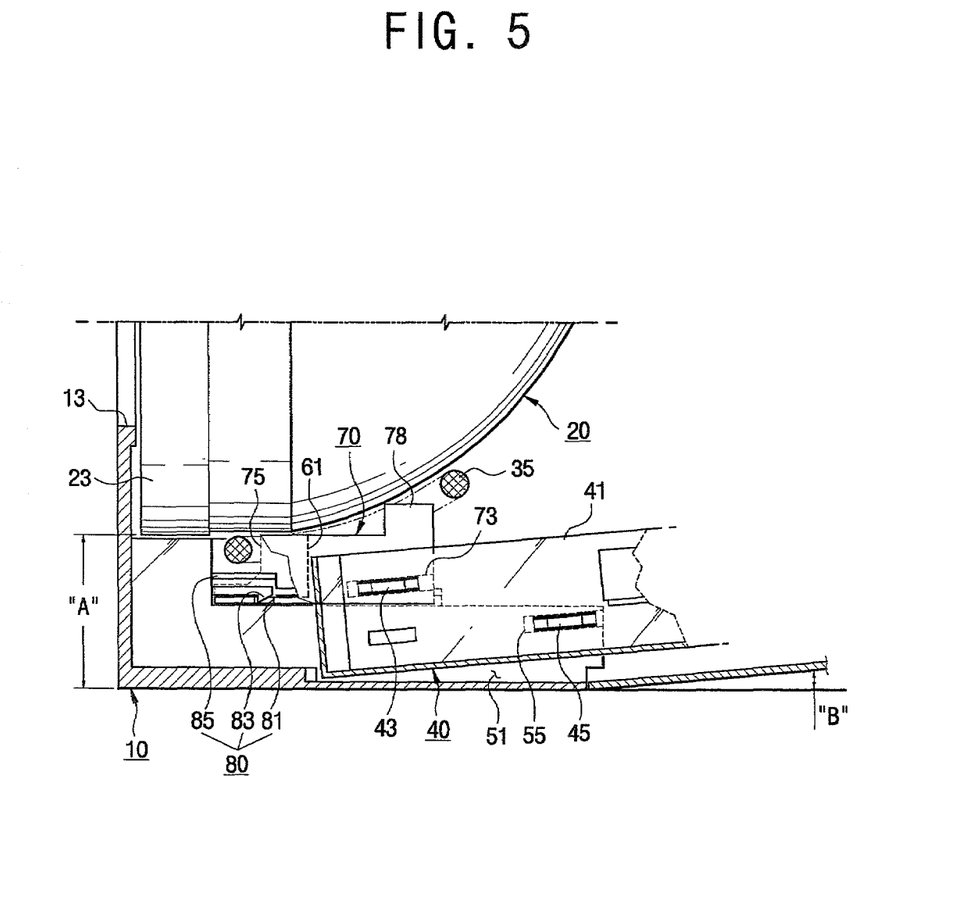

After the supporting holders 70 are attached, as shown in FIG. 5, the base frame 40 is received by supporting holders 70. In this way, the base frame 40 is coupled in back of the front casing 10 so as to allow the lower projections 45 and the upper projections 43 to be slidingly inserted into the lower guiding grooves 55 of the side wall supporting parts 51 and the upper guiding grooves 73 of the supporting holders 70, respectively. Then, since the projections 43, 45 and the grooves 55, 73 are combined along a plane that is not parallel with a plane of the combined guide rails 57 and rail grooves 77, the base frame 40 is coupled to the front casing 10 so as to be angled upward in the backward direction relative to the front casing 10, as indicated by "B" of FIG. 5.

The degaussing coil 35 disposed in the lower part of the CRT 20 is thus positioned in front of the base frame 40 and outside of both side walls 41, so that a space needed to secure the degaussing coil 35 is provided outside the base frame 40. Thus, there is no need to secure the upper space of the base frame 40 to fix the degaussing coil 35, thereby decreasing the vertical volume of the display apparatus 1. In addition, since the upper projections 43 and the lower projections 45 formed on both side walls 41 of the base frame 40 are respectively inserted into the upper guiding grooves 73 and the lower guiding grooves 55, the vertical height of the side wall supporting part 51 used to attach the base frame 40 can be remarkably reduced. Therefore, the vertical volume (indicated in "A" of FIGS. 3 through 5 and "B" of FIG. 5) of the display apparatus can be more effectively reduced.

After the base frame 40 is attached, the other units and components are properly assembled according to the assembling processes, and the rear casing 11 is coupled to the front casing 10. At this time, a lower space of the rear casing 11 can be reduced by the angle of inclination of the base frame 40.

In addition, after the base frame 40 is attached, when a combination of the CRT assembly 5 and the base frame 40 is progressed to or on standby for the next process, the inclined base frame 40 is contacted with the plane such as a conveyor and the like or the plane of a stand-by place. Thus, the front cover is inclined to have a little incidence in the backward direction, thereby preventing the assembly from tipping forward due to the height and weight of the CRT 20.

As described above, according to the present invention, there is provided a display apparatus whose visual volume can be reduced to a minimum and where the assembly can be prevented from tipping forward during the assembling processes.

Although the embodiments of the present invention have been disclosed for illustrative purposes, those skilled in the art will appreciate that various modifications, additions and substitutions are possible, without departing from the scope and spirit of the invention as disclosed in the accompanying claims and equivalents thereof.

What is claimed is:

1. A display apparatus comprising:
    a front casing having an opening;
    a rear casing coupled to said front casing to define an interior space;
    a cathode ray tube (CRT) coupled to said front casing and having a degaussing coil, said CRT being disposed in the interior space between said front casing and said rear casing and supported in the interior space along a support plane such that said CRT displays information through the opening;
    a main board disposed adjacent said CRT to transmit electrical signals to said CRT;
    a base frame disposed in the interior space under said CRT to hold said main board; and
    a frame supporting part positioned in a rear part of said front casing to support said base frame along a second plane having an upward angle of inclination relative to the support plane.

2. The display apparatus according to claim 1, wherein said frame supporting part comprises:
    a pair of side wall supporting parts provided at rear lower parts of said frame supporting part, the pair of side wall supporting parts to support opposite side walls of said base frame along the second plane, and
    a lower supporting part provided between the pair of side wall supporting parts, the lower supporting part to support a front lower part of said base frame.

3. The display apparatus according to claim 2, wherein:
    an inside wall of each side wall supporting part includes a lower guiding groove inclined upwardly along the second plane in a backward direction from said front casing, and
    each of the opposite side walls of said base frame includes a lower projection into which is received the respective lower guiding groove along the second plane.

4. The display apparatus according to claim 2, wherein each side wall supporting part further comprises a CRT supporting part that protrudes upwardly from an end part of the side wall supporting part to support a lower part of said CRT.

5. The display apparatus according to claim 4, further comprising:
a pair of supporting holders detachably coupled to upper parts of the respective side wall supporting parts along the support plane, said supporting holders to stably position the degaussing coil of the said CRT in front of said base frame and on an outside of the opposite side walls of said base frame.

6. The display apparatus according to claim 5, wherein:
each said supporting holder further comprises an upper guiding groove inclined parallel with the lower guiding groove of the corresponding side wall supporting part along the second plane,
each upper guiding groove is on an inside wall of said corresponding supporting holder, and
each of the opposite side walls of said base frames includes an upper projection that is slidingly inserted into the corresponding upper guiding groove along the second plane.

7. The display apparatus according to claim 5, wherein:
each said supporting holder further comprises a coil holding part at a front portion of said supporting holder, and
the coil holding parts hold portions of the degaussing coil in cooperation with back walls of said CRT supporting parts.

8. The display apparatus according to claim 5, wherein:
each of the side wall supporting parts includes a coil guide wall that extends from said CRT supporting part in the backward direction along an outside wall of the side wall supporting part, and
each said supporting holder includes a coil receiving part that is formed on an outside wall of said supporting holder, the coil receiving parts receiving therein portions of the degaussing coil in cooperation with the coil guide walls.

9. The display apparatus according to claim 5, wherein each said supporting holder includes an auxiliary CRT supporting part that is formed on a back end portion of said supporting holder, the auxiliary CRT supporting parts support portions of a funnel of said CRT.

10. The display apparatus according to claim 5, wherein:
each said supporting holder includes a rail groove that is lengthwise formed on a lower part of said supporting holder, and
each side wall supporting part includes a guide rail that is formed on an upper part of the side wall supporting part and is received by the corresponding rail groove along the support plane.

11. The display apparatus according to claim 5, further comprising:
holder supporting parts that prevent movement of said supporting holders relative to the side wall supporting parts.

12. The display apparatus according to claim 10, further comprising:
holder supporting parts that prevent movement of said supporting holders relative to the side wall supporting parts.

13. The display apparatus according to claim 11, wherein each said holder supporting part comprises:

an engaging hole formed at a front of said corresponding supporting holder; and
a hook protruding from a back wall of said corresponding CRT supporting part, the hook elastically engaged into and disengaged from the corresponding engaging hole.

14. The display apparatus according to claim 12, wherein each said holder supporting part comprises:
an engaging hole formed at a front of said corresponding supporting holder; and
a hook protruding from a back wall of said corresponding CRT supporting part, the hook being elastically engaged into and disengaged from the engaging hole.

15. The display apparatus according to claim 13, further comprising:
a hook protecting projection protruding from the back wall of said corresponding CRT supporting part to limit an upward range of elastic deformation of the corresponding hook.

16. The display apparatus according to claim 14, further comprising:
a hook protecting projection protruding from the back wall of said corresponding CRT supporting part to limit an upward range of elastic deformation of the corresponding hook.

17. The display apparatus according to claim 1, further comprising supporting holders coupled to said frame supporting part along the support plane and coupled to said base frame along the second plane.

18. The display apparatus according to claim 17, wherein each said supporting holder is attached to said frame supporting part using a rail and a groove along the support plane, wherein the rail is on one of said frame supporting part and said supporting holder, and the groove is on the other of said frame support part and said supporting holder.

19. The display apparatus according to claim 18, wherein said frame supporting part comprises side wall supporting parts, each side wall supporting part including the one of the rail and the groove.

20. The display apparatus according to claim 17, wherein each said supporting holder is attached to said base frame using a projection and a groove along the second plane, wherein the projection is on one of said base frame and said supporting holder, and the groove is on the other of said base frame and said supporting holder.

21. The display apparatus according to claim 20, wherein:
said base frame further comprises side walls, and
the one of the projection and the groove is on one of the side walls so as to be received by the corresponding supporting holder.

22. The display apparatus according to claim 11, wherein each said holder supporting part comprises:
an engaging hole formed at one of a front of said corresponding supporting holder and a back wall of said corresponding CRT supporting part,
a hook protruding from the other of the front of said corresponding supporting holder and the back wall of said corresponding CRT supporting part, and
the hook is elastically engaged into and disengaged from the corresponding engaging hole.

* * * * *